(12) United States Patent
Niessner et al.

(10) Patent No.: US 9,787,063 B2
(45) Date of Patent: Oct. 10, 2017

(54) SEALING RING FOR A SPARK PLUG OF AN INTERNAL COMBUSTION ENGINE, SPARK PLUG AND INTERNAL COMBUSTION ENGINE

(71) Applicant: Federal-Mogul Ignition GmbH, Neuhaus-Schierschnitz (DE)

(72) Inventors: Werner Niessner, Steinheim (DE); Alexander Schenk, Waiblingen (DE)

(73) Assignee: FEDERAL-MOGUL IGNITION GMBH, Neuhaus-Schierschni (DE)

( * ) Notice: Subject to any disclaimer, the term of this patent is extended or adjusted under 35 U.S.C. 154(b) by 125 days.

(21) Appl. No.: 14/674,470

(22) Filed: Mar. 31, 2015

(65) Prior Publication Data
US 2015/0311678 A1    Oct. 29, 2015

(30) Foreign Application Priority Data

Apr. 23, 2014   (DE) .................. 10 2014 105 694

(51) Int. Cl.
| | |
|---|---|
| *F16J 15/06* | (2006.01) |
| *H01T 13/08* | (2006.01) |
| *F02F 1/24* | (2006.01) |
| *F16J 15/08* | (2006.01) |

(52) U.S. Cl.
CPC ............. *H01T 13/08* (2013.01); *F02F 1/242* (2013.01); *F16J 15/061* (2013.01); *F16J 15/0806* (2013.01); *F16J 15/0887* (2013.01)

(58) Field of Classification Search
CPC .......... F02F 1/242; F16J 15/061; H01T 13/08
See application file for complete search history.

(56) References Cited

U.S. PATENT DOCUMENTS

| | | | | |
|---|---|---|---|---|
| 2,375,822 A | * | 5/1945 | Rose ..................... | H01T 13/08 313/128 |
| 2,941,105 A | | 6/1960 | Rickenbach | |
| 4,235,214 A | * | 11/1980 | Ito .......................... | H01T 13/08 123/169 V |
| 6,366,008 B1 | * | 4/2002 | Fukushima ............. | H01T 13/36 313/118 |
| 6,489,709 B1 | * | 12/2002 | Teramura ............... | H01T 13/08 313/135 |
| 2013/0133603 A1 | * | 5/2013 | Clark ..................... | F02B 77/00 123/143 R |

FOREIGN PATENT DOCUMENTS

| | | |
|---|---|---|
| DE | 60013014 T2 | 12/2004 |
| DE | 102011015183 A1 | 9/2012 |
| EP | 1508947 A1 | 2/2005 |
| GB | 836197 A | 6/1960 |

* cited by examiner

*Primary Examiner* — Kevin A Lathers
(74) *Attorney, Agent, or Firm* — Reising Ethington, P.C.

(57) ABSTRACT

A sealing ring for a spark plug that has an external thread for screwing into an internal combustion engine, a collar and a thread undercut between the external thread and the collar. The sealing ring includes a ring-shaped solid sealing element made from metal. The sealing element has two planar annular sealing surfaces that are arranged parallel to one another. An annular retaining element composed of an elastomer for engaging in the thread undercut of the spark plug in a self-retaining manner is attached to the sealing element on the inner ring side thereof. Also included is a spark plug comprising such a sealing ring, and an internal combustion engine comprising such spark plugs.

10 Claims, 1 Drawing Sheet

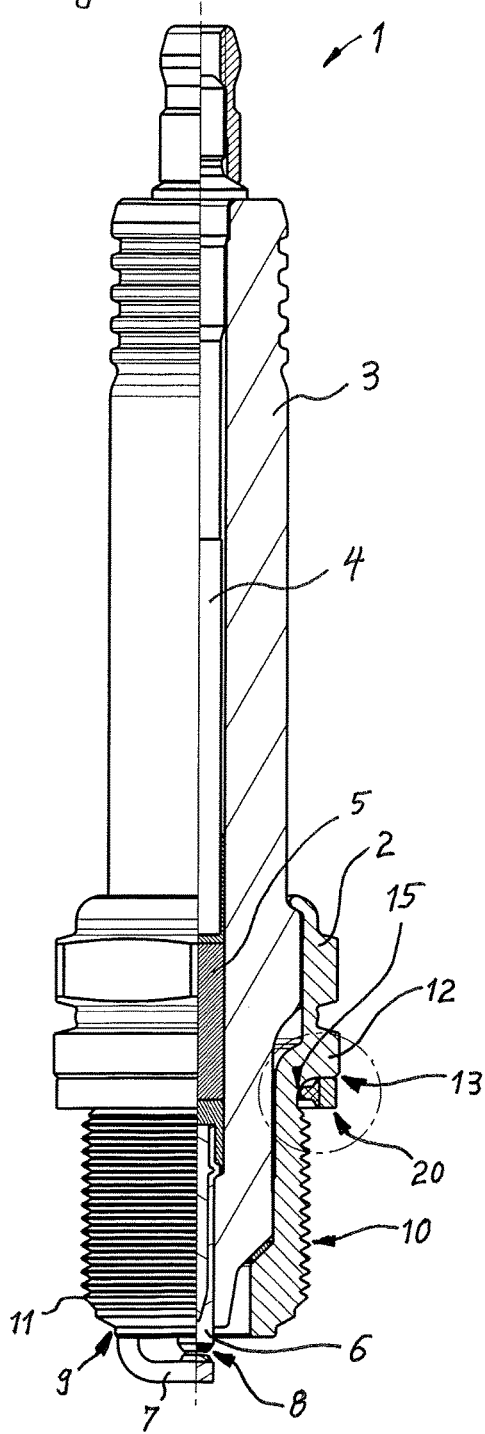

US 9,787,063 B2

SEALING RING FOR A SPARK PLUG OF AN INTERNAL COMBUSTION ENGINE, SPARK PLUG AND INTERNAL COMBUSTION ENGINE

This application claims priority to German Patent Application No. 10 2014 105 694.9, filed Apr. 23, 2014, the entire content of which is hereby incorporated by reference.

FIELD

The invention relates to a sealing ring for a spark plug of an internal combustion engine having a ring-shaped solid sealing element made from metal. The invention further relates to a spark plug having an external thread for screwing into an internal combustion engine, a collar and a thread undercut between the external thread and the collar, and to an internal combustion engine comprising such a spark plug.

BACKGROUND

For known spark plugs having a planar seal seat there is usually provided a sealing ring which forms a sealing between the spark plug and the cylinder head so that the overpressure generated in in the cylinder does not escape through the spark plug bore. Every once in a while, spark plugs are unscrewed from the cylinder head for maintenance purposes. In order that the sealing ring does not slip off from the external thread of the spark plug and get lost, the spark plug is usually provided with a self-retaining sealing ring. The sealing ring engages in a thread undercut arranged between the external thread and a collar of the spark plug in such a manner that it cannot slip off over the external thread of the spark plug by itself. Such a sealing ring is sometimes also designated as a "captive sealing ring."

Solid sealing rings for spark plugs, which, after sliding the sealing ring onto the external thread of the spark plug are deformed by means of an embossing or caulking process in such a manner that the sealing ring can no longer slip back over the external thread, are known in practice from many applications. The deformation of the sealing ring resulting from the embossing process forms a positive-locking fit with the external thread or the thread undercut and thereby ensures captivity. During the embossing or caulking process, relatively high forces are applied to the otherwise finished spark plug, which can have a negative effect. Moreover, the embossing or caulking process can result in deformations on the sealing surface of the sealing ring, which can impair the sealing quality of the spark plug when mounted later in the cylinder head.

Sealing rings having a solid annular sealing element made from metal have the advantage that they allow accurate positioning of the spark plug screwed into the cylinder head. These sealing rings are therefore primarily used if accurate positioning of the spark position of the spark plug is required, and hence if a predetermined protrusion dimension is to be met precisely with which electrodes, which form a spark gap at the front end of the spark plug, protrude into the combustion chamber.

Spark plugs are often also sealed with non-generic sealing rings which are made without a solid sealing element from a sheet metal strip that is folded multiple times in a U-shaped manner. Such folded sheet metal sealing rings can be deformed using low forces and thus can be easily attached to the spark plug in a self-retaining or captive manner. However, these non-solid sealing rings also deform easily and to a relatively large extent when the spark plug is screwed into the cylinder head and is tightened with a predetermined torque. When tightening the spark plug, a significant plastic deformation of the sealing ring occurs so that neither a predefined circumferential position of a ground electrode nor a predetermined protrusion dimension nor a predetermined spark position can be achieved. As an improvement, DE 600 13 014 T2 and EP 1 508 947 A1 each disclose a sealing ring which can be deformed with little force over a wide range so that when screwing in, the spark plug can be turned to such an extent that the ground electrode thereof is situated in a predefined circumferential position. However, in doing so, the screw-in depth of the spark plug is variable to a high degree resulting in great deviations for the protrusion dimension of the electrodes.

In DE 10 2011 015 183 A1, a non-generic spark plug without a sealing ring is disclosed, wherein the external thread is surrounded at least on a portion of its length by a sealing agent for sealing the combustion chamber. Although such a spark plug cannot lose a sealing ring, there is, however, the danger that the sealing of the spark plug is no longer ensured after unscrewing the spark plug from the cylinder head and subsequently screwing in the spark plug again.

It may be an object of the invention to provide a sealing ring for a spark plug, a spark plug and an internal combustion engine by means of which a predefined spark position in the combustion chamber and a predefined protrusion dimension of the spark plug electrodes protruding into the combustion chamber can be achieved in a precise manner.

SUMMARY

A sealing ring is adapted for a spark plug having an external thread for screwing into an internal combustion engine, a collar and a thread undercut. The sealing ring includes an annular solid sealing element made from metal. The sealing element has two planar annular sealing surfaces that are arranged parallel to one another. The sealing surfaces are perpendicular to an imaginary center line of the sealing ring. An annular retaining element is attached on the inner ring side of the sealing element. The retaining element serves for engaging in the thread undercut of the spark plug in a self-retaining manner when the sealing ring is slid over the external thread onto the spark plug body and rests with one of its sealing surfaces against a planar seal seat of the spark plug. The retaining element is composed of an elastomer, which can be a thermoplastic elastomer. The retaining element has no sealing function.

A spark plug with a self-retaining sealing ring has a front end with an external thread adapted for screwing into an internal combustion engine. At its front end, the elongated spark plug has two electrodes forming a spark gap. The spark plug includes a spark plug body on which the external thread is arranged. The spark plug body has a collar on the side of the external thread that faces away from the front end of the spark plug. A planar seal seat having a sealing surface facing towards the front end of the spark plug is arranged on the collar. The sealing surface is planar and annular. A thread undercut is provided in the transition region between the external thread and the sealing surface of the spark plug. The thread undercut is provided at the run-out of the external thread in order to reduce the notch effect at the transition to the collar. The thread undercut has a region, the outer diameter of which is smaller than the core diameter of the external thread. The thread undercut transitions with a transition radius into the collar. In the region of the thread undercut, a sealing ring is arranged in a self-retaining manner so that the sealing ring cannot slip off over the external thread by itself and get lost when the spark plug is being unscrewed from the internal combustion engine. For this purpose, the sealing ring engages in the thread undercut of the spark plug body in a self-retaining manner by means of its retaining element. At least in one section, the retaining element of the sealing ring has an inner diameter that is smaller than the outer diameter of the external thread of the spark plug. When the spark plug is installed, the retaining element does not rest against the spark plug body, at least not in a sealing manner. The outer diameter of the spark plug body in the region of the thread undercut can be smaller than the inner diameter of the retaining element.

An internal combustion engine includes an engine block, a plurality of cylinders, a crankshaft and a cylinder head. The cylinder head has a spark plug bore for each cylinder. The spark plug bore has an internal thread and an annular planar sealing surface. In each of the spark plug bores, a spark plug with a sealing ring is arranged. The spark plug rests with a sealing surface of its sealing ring against the corresponding sealing surface of the cylinder head so that secure sealing of the combustion chamber of the corresponding cylinder is ensured. Each of the spark plugs has at least one ground electrode at the front end of its spark plug body, which ground electrode has a section that runs transverse to an imaginary center line of the spark plug. For each of the screwed-in spark plugs, the angle between the ground electrode section running transverse to the center line and the crankshaft of the internal combustion engine is similar.

The invention may have (but which are not necessary) advantages listed in the following paragraphs:

A sealing ring is particularly well suited for sealing a spark plug with respect to a cylinder head of an internal combustion engine. The sealing ring with its solid sealing element made from metal ensures very good sealing of the combustion chamber even if very high pressures occur in the combustion chamber. Leaks can be avoided, which occur at high engine pressures in the case of folded sheet metal sealing rings.

The solid sealing element ensures a very precise spark position of the spark plug. If a plurality of spark plugs is tightened with a predetermined torque, the solid sealing element ensures that each of the spark plugs has the same screw-in depth. No noteworthy plastic deformation of the sealing ring occurs, and the electrodes forming the spark gap protrude in each cylinder to an equal extent into the combustion chamber. All of the installed spark plugs thus exhibit the same protrusion dimension. The spark plug is particularly well suited for engines which operate with fuel stratified direct-injection. Here, fuel is injected directly into the combustion chamber in such a manner that an ignitable mixture is not formed in the entire combustion chamber, but only in certain stratums.

The annular retaining element on the sealing ring ensures that the sealing ring can be arranged on the spark plug in a self-retaining and captive manner. Assembling the sealing ring on a spark plug is particularly easy. The sealing ring merely has to be slid over the external thread of the spark plug. In doing so, the annular retaining element deforms elastically. As soon as the retaining element reaches the thread undercut, it contracts again automatically and secures the sealing ring in this position on the spark plug. No additional embossing or caulking process as in the prior art is necessary to plastically deform the sealing ring and to prevent the sealing ring from slipping off from the external thread. This simplifies the assembly of spark plug and sealing ring significantly. Assembling the sealing ring can take place as the last assembly step without the risk that the spark plug is impaired by high force application during the sealing ring assembly. By avoiding plastic deformation on the sealing ring, manufacturing cost and scrap rate can be reduced.

The elastomer retaining element is arranged between the sealing surfaces on the inner ring side of the sealing element and does not serve for sealing the spark plug. Due to the high temperatures occurring at the sealing surface and the high pressures occurring at the same time, an elastomer on a spark plug is not suitable for ensuring the sealing of the spark plug. The sealing of the spark plug is achieved exclusively by the solid sealing element from metal. The retaining element only has a retaining function. The retaining element prevents the sealing ring from slipping off the spark plug when the spark plug is not screwed into an internal combustion engine. The non-sealing retaining element is only subjected to thermal stress, but not to mechanical stress when the spark plug is screwed in.

When the spark plug is screwed in, a predefined circumferential position of a ground electrode can be achieved simultaneously with the defined spark position. For this purpose, the thread beginning of the external thread of the spark plug can be arranged in a defined circumferential position relative to the ground electrode. The thread beginning of the internal thread at the spark plug bore in the cylinder head can likewise have a predefined circumferential position, for example with respect to the crankshaft.

Overall, a very accurate and reproducible installation position of the spark plug can be ensured.

In an embodiment it can be provided that the sealing element of the sealing ring has a rectangular cross-section. The cross-section through the sealing ring corresponds to a longitudinal section through the spark plug. The retaining element can be connected to the sealing element in a substance-to-substance bonded manner. This ensures simple manufacturing of the sealing ring.

The metallic sealing element can be composed of stainless steel, steel, soft iron or aluminum. The material can be selected such that no significant plastic deformation occurs under the specified tightening torque of the spark plug, and that a material is selected that fits for the material of the cylinder head so that the material combinations between the spark plug body, sealing element of the sealing ring and the cylinder head do not result in a galvanic element that facilitates electrochemical corrosion. For this reason, cooper should be avoided as the material for the sealing element of the sealing ring.

In an embodiment, the retaining element can be arranged completely between two planes defined by the two sealing surfaces of the sealing element. An imaginary plane is placed on each of the two sealing surfaces of the sealing element so that the two imaginary planes and the inner ring side of the sealing element form in the sealing ring a closed space in which the entire retaining element is accommodated. This ensures that the retaining element does not protrude beyond the planes defined by the two sealing surfaces of the sealing element and does not participate in the sealing function of the sealing ring. Thus, in particular, the retaining element does not rest against the annular sealing surface of the planar seal seat of the spark plug or against the annular sealing surface of the cylinder head. It is ensured that only the metallic sealing element rests against the planar seal seat of the spark plug and against the sealing surface of the cylinder head and ensures the sealing function. By the functional separation at the sealing ring it is achieved in a very simple manner that the retaining element can be optimized with respect to its retaining function and the sealing element can be optimized with respect to its sealing function.

In another embodiment, the retaining element of the sealing ring has an inwardly projecting lip that deflects when sliding the sealing ring onto the external thread of the spark plug, and behind the external thread, it springs back into the thread undercut. This configuration ensures a particularly good and simple mountability of the sealing ring on the spark plug while providing good fulfillment of the self-retaining function at the same time. The retaining element can have two planar annular surfaces which are arranged parallel to one another. The two annular surfaces of the retaining element can be arranged parallel to the sealing surfaces of the sealing element. The distance between the two annular surfaces of the retaining element can be smaller than the distance between the two sealing surfaces of the sealing element.

In a further embodiment the retaining element of the sealing ring can have a temperature resistance of 220° C., in particular of 280° C. In particular, the retaining element can have high chemical resistance against fuels and oils. Suitable materials for the elastomer of the retaining element are fluoroelastomer, perfluoroelastomer, silicone or fluorosilicone.

The spark plug according to the invention can include an inner conductor, an insulator surrounding the inner conductor, a spark plug body surrounding the insulator, and two electrodes, a first electrode of which is a center electrode that is connected to the inner conductor in an electrically conductive manner, and a second electrode of which is a ground electrode that is connected to the spark plug body in an electrically conductive manner. The spark plug body is made from metal. The use of a sealing ring, such as that described herein, on such a spark plug may be advantageous.

DRAWINGS

Further advantages and features arise from the sub-claims and the subsequent description of an exemplary embodiment in connection with the figures. In the figures:

FIG. 1 shows a side view of a spark plug, the right half of which is illustrated in longitudinal section, FIG. 2 shows an enlarged illustration of the region of the spark plug encircled in FIG. 1 by a dot-dashed line.

DESCRIPTION

The spark plug 1 illustrated in the FIGS. 1 and 2 includes a sleeve-shaped spark plug body 2 made from metal and an elongated insulator 3 made from ceramics. The insulator 3 surrounds an inner conductor 4 which is connected inside the insulator 3 to a center electrode 6 in an electrically conductive manner via a glass seal 5. A ground electrode 7, which forms a spark gap 8 with the center electrode 6, is attached to the spark plug body 2. The electrodes 6, 7 are arranged at the front end 9 of the spark plug 1, with which front end the spark plug protrudes into a combustion chamber in the installed state. At the front end 9, the spark plug body 2 has an external thread 10 for screwing the spark plug into a corresponding internal thread of a spark plug bore in a cylinder head of the internal combustion engine. The beginning of the first thread turn of the schematically illustrated external thread 10 is designated as thread start 11 and can have a defined circumferential position with respect to the ground electrode 7. After screwing into the internal combustion engine, the section of the ground electrode 7 that runs transverse to the center line 1 of the spark plug 1 then has a predefined angle with respect to the crankshaft.

The spark plug body 2 has a collar 12 which is arranged on the side of the external thread 10 that faces away from the front end 9. A planar seal seat 13 is arranged on the collar 12. The planar seal seat 13 has a sealing surface 14 that faces towards the front end 9. The sealing surface 14 is an annular planar surface. A thread undercut 15 is provided between the external thread 10 and the sealing surface 14. The thread undercut 15 ensures a transition of low notch effect from the external thread 10 to the collar 12 in that, as shown in FIG. 2, a section of the thread undercut 15 has an outer diameter that is smaller than the core diameter of the external thread 10.

A sealing ring 20 is arranged in the region of the thread undercut 15. The sealing ring 20 includes an annular solid sealing element 21 made from metal, as can be seen in particular in FIG. 2. The sealing element 21 has two planar annular sealing surfaces 22 and 23 that are arranged parallel to one another. The sealing surface 22 rests against the sealing surface 14 of the spark plug. When the spark plug 1 is screwed into the internal combustion engine, the sealing surface 23 rests against an annular planar sealing surface on the cylinder head and thereby provides sealing between the spark plug 1 and the cylinder head.

An annular retaining element 24 that is composed of an elastomer is attached to an inner ring side of the sealing element 21. The retaining element 24 is connected to the sealing element 21 in a substance-to-substance bonded manner. The sealing element 21 has a rectangular cross-section, see FIG. 2. The retaining element 24 has an inner diameter that is smaller than the outer diameter of the external thread 10. When mounting the sealing ring 20 on the spark plug 1, the sealing ring 20 in the illustration of FIG. 1 is slid from the bottom upwards over the external thread 10. In doing so, the retaining element 24 expands elastically and slides over the external thread 10. When the retaining element 24 reaches the thread undercut 15, the annular retaining element 24 contracts again and engages in the thread undercut 15. This prevents the sealing ring 20 from self-actingly slipping back over the external thread 10. The sealing ring 20 is situated on the spark plug 1 in a self-retaining manner and cannot get lost.

The outer diameter of the spark plug body 2 in the region of the thread undercut 15 is smaller than the inner diameter of the retaining element 24. The sealing ring 20 is retained with slight play in its desired position in front of the planar seal seat 13 of the spark plug 1. The retaining element 24 is arranged completely between the two planes 22 and 23 of the sealing surfaces of the sealing element 21. Thus, the retaining element 24 is not thicker than the sealing element 21 so that the sealing function is assumed exclusively by the sealing element 21. The retaining element 24 has two planar annular surfaces 25 and 26, which are arranged parallel to one another and parallel to the sealing surfaces 22, 23 of the sealing element 21. The distance between the two annular surfaces 25 and 26 is smaller than the distance between the two sealing surfaces 22 and 23. The distance between the annular surfaces 25 and 26 is particularly 30% to 60% of the distance between the sealing surfaces 22 and 23.

LIST OF REFERENCE NUMBERS 1 spark plug
2 spark plug body
3 insulator
4 inner conductor
5 glass seal
6 center electrode
7 ground electrode
8 spark gap
9 front end
10 external thread
11 thread start
12 collar
13 planar seal seat
14 sealing surface
15 thread undercut
20 sealing ring
21 sealing element
22 sealing surface
23 sealing surface
24 retaining element
25 planar annular surface
26 planar annular surface

The invention claimed is:

1. A sealing ring adapted for use with a spark plug, the sealing ring comprising:
a ring-shaped solid sealing element comprised of metal, wherein the sealing element has two planar annular sealing surfaces that are arranged parallel to one another; and
an annular retaining element comprised of an elastomer for engaging in a self-retaining manner in the thread undercut of the spark plug is attached to the sealing element on an inner ring side thereof;
wherein the retaining element is constructed completely between two planes defined by the two sealing surfaces of the sealing element.

2. The sealing ring according to claim 1, wherein the sealing element has a rectangular cross-section.

3. The sealing ring according to claim 1, wherein the retaining element is connected to the sealing element in a substance-to-substance bonded manner.

4. The sealing ring according to claim 1, wherein the retaining element has two planar annular surfaces which are arranged parallel to one another.

5. The sealing ring according to claim 4, wherein the two annular surfaces of the retaining element are arranged parallel to the sealing surfaces of the sealing element.

6. The sealing ring according to claim 4, wherein the distance between the two annular surfaces of the retaining element is smaller than the distance between the two sealing surfaces of the sealing element.

7. The sealing ring according to claim 1, wherein the elastomer of the retaining element has a temperature resistance of at least 220° C.

8. A spark plug comprising:
a front end with an external thread adapted for screwing into an internal combustion engine;
two electrodes forming a spark gap at the front end;
a spark plug body on which the external thread is arranged, the spark plug body has a collar on a side of the external thread that faces away from the front end of the spark plug, the collar has a planar seal seat, the planar seal seat has an annular planar sealing surface that faces towards the front end of the spark plug, and a thread undercut is provided between the external thread and the annular planar sealing surface; and
a sealing ring having a ring-shaped solid sealing element and an annular retaining element, the ring-shaped solid sealing element is comprised of metal and has two planar annular sealing surfaces that are arranged parallel to one another, and the annular retaining element is comprised of an elastomer and is attached to the ring-shaped solid sealing element on an inner ring side thereof;
wherein the sealing ring is arranged on the spark plug body, and the sealing ring engages in the thread undercut in a self-retaining manner by way of the annular retaining element.

9. The spark plug according to claim 8, wherein an outer diameter of the spark plug body in a region of the thread undercut is smaller than an inner diameter of the retaining element of the sealing ring.

10. An internal combustion engine comprising an engine block, a plurality of cylinders, a crankshaft and a cylinder head, wherein the cylinder head has for each cylinder one spark plug bore which has an internal thread and an annular planar sealing surface;
the spark plug of claim 9 is arranged in each of the spark plug bores, and each spark plug rests with a sealing surface of its sealing ring against the corresponding sealing surface of the cylinder head; and
each of the spark plugs has at the front end of its spark plug body at least one ground electrode which has a section running transverse to an imaginary center line of the spark plug, and wherein for each spark plug, the angle between the section of its ground electrode running transverse to the center line and the crankshaft of the internal combustion engine is similar.

* * * * *